July 9, 1957 A. H. FURNISH 2,798,630
ELECTRICAL OUTLET BOX
Filed June 22, 1956

INVENTOR.
ARTHUR H. FURNISH
BY
ATTORNEY

United States Patent Office 2,798,630
Patented July 9, 1957

2,798,630

ELECTRICAL OUTLET BOX

Arthur H. Furnish, Wellington, Ohio

Application June 22, 1956, Serial No. 593,248

6 Claims. (Cl. 220—3.6)

This invention relates to electrical outlet boxes or the like and more particularly to a junction or outlet box which is adapted for easy mounting in dry wall construction, in newly plastered walls and in older buildings where the wall surface is already in place.

Ordinarily, it has been necessary to mount electrical outlet or junction boxes by attaching them to the framework of the building before the wall boards or plaster base is nailed to the studs. It takes both time and material to attach brackets or to bridge across between studs and the slightest error in mounting the boxes to the framework is very difficult to correct later on.

In dry wall construction, a small error in measuring can spoil a sheet of wallboard or leave a hole to be plugged with patching plaster. If plaster is to be used, its thickness must be anticipated exactly or the plasterer will have to reduce or increase the thickness of the plaster near the box or the switch or receptacle plate will not lie flush against the wall. In older buildings, it is often desirable to alter or add to the wiring system. Where wires or sheathed cables can be gotten between the studs, it is often impossible to attach an outlet box to the frame without doing serious damage to the wall surfaces. This invention will reduce the chance of error, save both time and material and will automatically guarantee that every switch and receptacle plate will fit perfectly flush against the wall.

It is an important object of this invention to enable an outlet or junction box to be installed in any position between the studs of a building without the use of boards or brackets or other supporting means extending between the studs to hold the boxes in place.

It is another important object of this invention to provide means whereby the outlet or junction box may be directly attached to a plastered wall or to a dry wall construction by the provision of means for mounting or fastening the box to plaster and lath or to various types of dry wall construction after the wall has been attached to the framework of the building.

A further object of this invention is the provision of a simple and easily operated clamping means carried by the outlet box and having releasable engagement with the wall construction in which the box is to be mounted whereby the box may be firmly secured in the desired position.

Another object of the invention is to enable the wiring to be run in the usual manner in the building frame with the ends of the wires or sheathed cables free to be inserted into the boxes and connected therein as the boxes are installed. Thus, by means of this invention, the plaster base or wallboard may then be applied to the framework and, as it is secured in place, can be marked with pencil or crayon at the approximate position for each box, or the loose ends of the wires or sheathed cables may be thrust through small rough holes in the wall material. Then, after the wallboard is nailed to the studs, the electrician can work from the outside of the wall, cut the openings in exactly the right place and size required for each box.

A still further object of this invention is to provide a clamping means for attaching an outlet box in a wall opening and secure the same in place from the outside of the wall while the box is held in position from the outside of the wall.

Another object of this invention is the provision of an outlet box construction having end walls terminating in opposed outwardly disposed flanges for engagement with the outer surface of a wall construction and having movably and quickly adjustable clamping members carried in said end walls and cooperating with said flanges to securely mount the box in the wall opening.

Another object of the invention is the provision of clamping means whereby an outlet box may be quickly and easily mounted on plaster and lath or wallboard constructions and which is self-adjustable to the thickness of the wall material to insure that the box will be rigidly clamped in place.

A still further object of the invention is to provide a retractable clamping means comprising a movable part mounted on each of the end walls of the outlet box which is capable of being operated from a position inside the box so that a movable clamping plate lies flat against the end surface of the box and at right angles to the wall while the box is being inserted into the wall opening and may then be projected to full clamping position, parallel to the inner surface of the wall and at right angles to the ends of the box. In this position it is directly opposite the outwardly disposed flanges and can receive fastening devices such as screws thrust through openings in the flanges which would penetrate the wall material and enter openings in the movable plate fitted to receive them. As these fasteners or screws are rotated they will draw both the flanges and the movable plates into firm contact with the wall material and thus hold the entire box assembly to the wall with a vise-like grip.

Other objects and advantages of this invention will become more apparent as the following description of an embodiment thereof progresses, reference being made to the accompanying drawing in which like reference characters are employed to designate like parts throughout the same.

Figure 1:
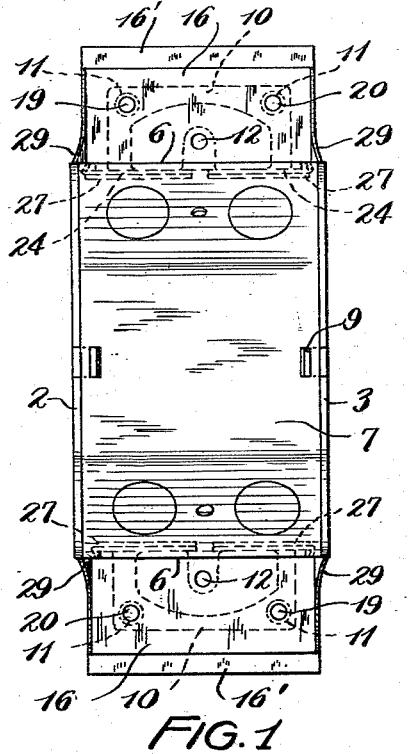
Figure 1 is a bottom view of an outlet box or junction box embodying my invention, showing the movable clamping members carried at each end of the box moved to clamping position.

In carrying out my invention as applied to an outlet or junction box, indicated generally at 1 and which substantially corresponds to present day design with certain exceptions which will be pointed out hereinafter, the box essentially consists of two opposed side walls 2 and 3 which extend substantially parallel to each other and which are provided with inturned lugs 4 at their outer extremities, these lugs being apertured to receive a machine screw 5 by which the side plates are securely attached to the end walls 6 formed as a continuation of the bottom wall 7. The side walls 2 and 3 are also provided with inwardly inclined lugs 8 which are adapted to be inserted at their ends in slots 9 in the bottom wall 7. By such means, the assembly of the box is complete and forms a rigid receptacle for the purpose set forth. The end walls 6 terminate in outwardly and oppositely disposed wall flanges 10 which are adapted to engage the outer surface of a wall W upon which the box is to be mounted and clamped. Each of the end flanges is provided with openings 11 on opposite sides thereof and a substantially central threaded opening 12.

In further carrying out the invention, it will be noted that the end walls 6 are cut back or relieved inwardly of the wall as at 13 and 14, so that when the end walls are assembled on the side walls of the box 2 and 3, there will be formed therebetween elongated slots 15 extending upwardly from near the bottom of the end walls to a point near the top thereof, in each instance.

Figure 2:
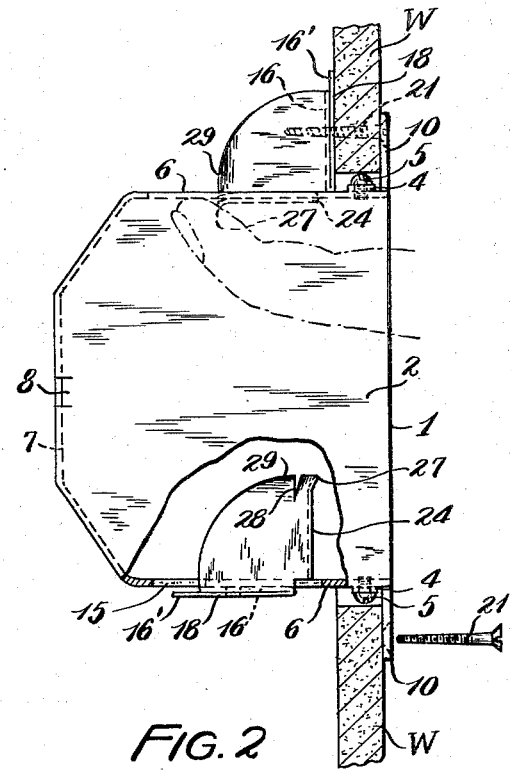
Figure 2 is a side elevation of the box shown in Figure 1 shown applied in an opening in a dry wall construction and wherein one of the clamping members is shown in clamped position and, as shown in the broken away portion of the view, the other clamping member is disposed in retracted position within the box and out of engagement with the wall.
Figure 4:
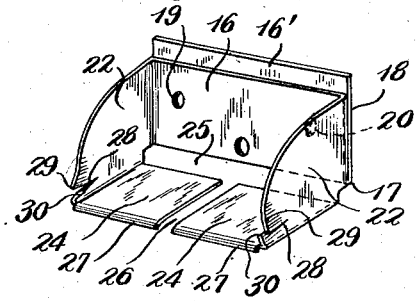
Figure 4 is a perspective view of one of the movable clamping members which is mounted in each end wall of the outlet box, as illustrated in Figure 2.

Referring more particularly now to Fig. 4, I will describe in detail the construction of one of the clamping members carried and movable along each end wall of the box. These clamping members may consist of a piece of light sheet metal formed as a stamping and comprising a back or clamping wall 16 reinforced by folding the metal upon itself, as at 17, to provide a flat substantially rectangular clamping plate which is adapted to engage the inner surface of a dry wall construction and which is shown as having a wall contacting portion 18, preferably of greater width than the back wall 16 so as to provide an overlying area 16'. The walls 16 and 18 lie flat one upon the other and may be secured together by spot welding or otherwise, if desired. This composite back wall construction is then provided with a pair of oppositely disposed threaded openings 19 and 20 for receiving threaded fasteners, such as screws, indicated at 21, carried by the oppositely disposed end flanges 10 and passing through the wall W to be engaged in the composite back wall of the movable clamping member, as shown in Fig. 2.

The stamping is further provided with two hinge portions 22 and 23 forming side walls or wings and extending outwardly of the composite end wall 16 and substantially at right angles thereto and in spaced relation to each other. Each of the wings 22 and 23 terminates in an inwardly extending portion 24 lying in a plane substantially at right angles to the wings 22 and 23 and also in substantially right angular relationship with the composite back wall 16, 18, there being provided a space between the inner longitudinal edges of the wall portions 24 and the lower folded edge 17 of the composite wall 16, as indicated at 25. The oppositely and inwardly extending wall portions 24 are spaced as at 26 and their forward edges 27 are formed to extend out of the plane of the portions 24 and downwardly thereof, as shown in Fig. 4.

Figure 3:
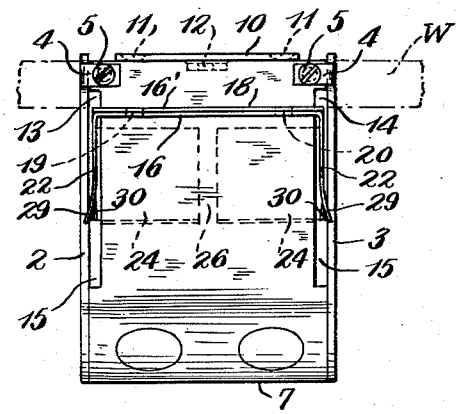
Figure 3 is an end view of the box shown in Figure 1.

I have provided means whereby the movable clamping members, such as that shown in Fig. 4, may be releasably held in clamping position after the same has been extended to such position and before the fastening members 21 are applied. An example of such means is illustrated in Fig. 4, in which the lower forward portion of each of the wings 22 and 23 adjacent the respective wall portions 24 is slit rearwardly down the composite wall 16, as indicated at 28. The adjacent edges of the wing forming the slit are bent or formed to lie in opposed directions and due to the resiliency of the metal from which the movable clamping member is formed, will provide an outwardly projecting toothed portion 29 and an inwardly projecting toothed portion 30. It is the purpose of the outwardly projecting toothed portion 29 to snap into a position overlying the edge of the end of the side walls 2 and 3, as illustrated more clearly in Figs. 1 and 3, thus providing a snap lock to retain the composite wall 16 in wallboard engaging or clamping position. This locking means is releasable to withdrawn the clamping member to the position shown in the lower part of Fig. 2, that is, out of engagement with the inner surface of the wall W to be nested within the outlet box 1. This release is easily accomplished by inserting a finger into the opening of the box to underlie the turned down lips 27 and exerting a downward and outward pressure against the lips, as indicated in dotted lines in Fig. 2. Such a pressure will cause the opposed inner spaced edges of the wall portions 24 to be lifted, thus drawing in the wings 22 and 23 until the projection 29 is out of engagement with the end edges of the side walls 2 and 3, respectively. When this has been accomplished, a clamping member may be shifted to the position shown in the lower part of Fig. 2.

As pointed out above, by the present construction, I am enabled to quickly and easily mount an outlet box in walls of different thicknesses. This is accomplished by the freely movable clamping members slidably and rotatably carried in each of the end walls of the box and which are self-adjusting to the thickness of the wall within which the box is to be mounted. Such adjustment is easily attained by rotating the movable clamping members to the position shown in the upper part of Fig. 2 and then sliding the entire unit toward the inner surface of the wall W whereby the composite wall 16, 16' will lie flat in contact with the wallboard or plaster board. In such position, the fastening screws 21 may be inserted in the aligned openings carried by the flanges 10 and the composite walls 16, as indicated at 19 and 20. When the screws are tightened, the box will be rigidly affixed to the wall and may just as easily be removed by reversing the process.

It will be noted that when the movable clamping members are in wall engaging position, the maximum clearance is provided in the box whereby the electrician will have freedom of movement in making the connections with the wires to be connected.

Various changes may be made in the details of construction and arrangement of parts of the invention without departing from the spirit thereof or the scope of the appended claims.

I claim:

1. An outlet box having parallel spaced elongate slots in opposite ends thereof and having outwardly and oppositely extending clamping flanges for engagement with the outer surface of a wall in which said box is to be mounted, clamping members for engagement with the inner surface of said wall and cooperating with said flanges to removably and rigidly clamp the box in a wall opening, said clamping members being slidable and tiltable along said slots to and from clamping position relative to said flanges, and releasable means on said members for retaining the members in said clamping position, said releasable means having portions underlying and in engagement with a wall of said slots whereby to retain the respective clamping members in clamping position, said clamping members having portions extending inwardly from their opposite sides, each portion having a finger grip formed thereon whereby upon the application of a pulling pressure said retaining means is released to permit said clamping members to be tilted out of clamping position to a nested position within said box.

2. An outlet box having parallel spaced elongate slots in opposite ends thereof and having outwardly and oppositely extending clamping flanges for engagement with the outer surface of a wall in which said box is to be mounted, clamping members for engagement with the inner surface of said wall and cooperating with said flanges to removably and rigidly clamp the box in a wall opening, said clamping members each comprising a wall engaging surface cooperating with said respective flanges, wing portions operable in said slots extending rearwardly of said wall engaging surface, and means formed on said wing portions having releasable engagement with a wall of the respective slots whereby said clamping members may be releasably maintained in contact with the inner surface of the wall in which the box is installed, and fastening means extending through the flanges and the clamping members to securely clamp the same to a wall.

3. An outlet box having parallel spaced elongate slots in opposite ends thereof and having outwardly and oppositely extending clamping flanges for engagement with the outer surface of a wall in which said box is to be mounted, clamping members for engagement with the inner surface of said wall and cooperating with said flanges to removably and rigidly clamp the box in a wall opening, said clamping members each comprising a wall engaging surface cooperating with said respective flanges, wing portions operable in said slots extending rearwardly of said wall engaging surface, means formed on said wing portions having releasable engagement with a wall of the respective slots whereby said clamping members may be releasably maintained in contact with the inner surface of the wall in which the box is installed, fastening means extending through the flanges and the clamping members to securely clamp the same to a wall, and resilient gripping means extending inwardly from each wing portion whereby said wings may be flexed out of engagement with said slot walls to return the members from wall clamping to nested position within the box.

4. An outlet box having parallel spaced elongate slots in opposite ends thereof and having outwardly and oppositely extending clamping flanges for engagement with the outer surface of a wall in which said box is to be mounted, clamping members for engagement with the inner surface of said wall and cooperating with said flanges to removably and rigidly clamp the box in a wall opening, said clamping members each comprising a wall engaging surface cooperating with said respective flanges, wing portions operable in said slots to selectively bring said wall engaging surface of the clamping members into flat engagement with the inner surface of the wall in which the box is to be mounted and to bring said surface into flat engagement with a side of said box when in retracted position, said wing portions extending rearwardly of said wall engaging surface, means formed on said wing portions having releasable engagement with a wall of the respective slots whereby said clamping members may be releasably maintained in contact with the inner surface of the wall in which the box is installed, fastening means extending through the flanges and the clamping members to securely clamp the same to a wall, and resilient gripping means extending inwardly from each wing portion whereby said wings may be flexed out of engagement with said slot walls to return the members from wall clamping to nested position within the box.

5. An outlet box having a pair of spaced apart elongate slots in each of the opposite end walls of the box and having outwardly and oppositely extending wall engaging clamping flanges projecting from each end wall of the box for engagement with the outer surface of a wall in which the box is to be mounted, a clamping member movable along each pair of slots and extending transversely of each of the box opposite end walls for engagement with the inner surface of said wall in which the box is to be mounted, each of said clamping members cooperating with the adjacent respective box clamping flanges to removably and rigidly clamp the box in an opening in the wall in which the box is mounted, each of said transverse clamping members being individually slidable along and tiltable in its respective slots to and from clamping position relative to said respective clamping flanges, and releasable means on said clamping members for retaining the members in said clamping position.

6. An outlet box having a pair of spaced apart elongate slots in each of the opposite end walls of the box and having outwardly and oppositely extending wall engaging clamping flanges projecting from each end wall of the box for engagement with the outer surface of a wall in which the box is to be mounted, a clamping member movable along each pair of slots and extending transversely of each of the box opposite end walls for engagement with the inner surface of said wall in which the box is to be mounted, each of said clamping members cooperating with the adjacent respective box clamping flanges to removably and rigidly clamp the box in an opening in the wall in which the box is mounted, each of said transverse clamping members being individually slidable along and tiltable in its respective slots to and from clamping position relative to said respective clamping flanges, and releasable means on said clamping members for retaining the members in said clamping position, said releasable means having portions underlying and in engagement with a wall of said respective slots whereby to retain the respective clamping members in box clamping position.

References Cited in the file of this patent

UNITED STATES PATENTS

| | | |
|---|---|---|
| 2,531,698 | Petrick | Nov. 28, 1950 |
| 2,675,140 | Pommerening | Apr. 13, 1954 |